July 23, 1963     P. HUSKA     3,098,960
MOTOR DRIVEN ROTARY SELECTOR VALVE

Filed June 22, 1959     3 Sheets-Sheet 1

INVENTOR.
PAUL HUSKA
BY
ATTORNEY

July 23, 1963 P. HUSKA 3,098,960
MOTOR DRIVEN ROTARY SELECTOR VALVE
Filed June 22, 1959 3 Sheets-Sheet 2

INVENTOR.
PAUL HUSKA
BY
ATTORNEY

INVENTOR.
PAUL HUSKA
BY
ATTORNEY

United States Patent Office 3,098,960
Patented July 23, 1963

3,098,960
MOTOR DRIVEN ROTARY SELECTOR VALVE
Paul Huska, 739 Moreno Ave., Los Angeles 49, Calif.
Filed June 22, 1959, Ser. No. 821,734
2 Claims. (Cl. 318—443)

This invention relates to rotary selector valves of the type disclosed in U.S. Letters Patent to Mayhew, No. 2,821,998, issued February 4, 1958, and Wadleigh, No. 2,840,109, issued June 24, 1958, and has as its general object to provide an improved actuator and indexing mechanism for the operation of such valve.

A specific object of the invention is to provide means for accurately registering a lateral rotor port to a casing port of such a valve.

A further object is to provide power driven means for indexing the rotor of such a valve to any one of a plurality of selective positions of such rotor within the valve casing.

A further object is to provide a mechanism for automatically operating the valve through a complete cycle of operation wherein it is successively indexed through a series of positions in accordance with a pre-determined schedule of selection of those positions, and wherein the valve is held for a pre-determined length of time at each of the scheduled positions so that it may handle succeeding flows of pre-determined duration in a pre-determined schedule of successive flow paths.

Other objects and advantages will become apparent in the ensuing specification and appended drawing in which:

FIG. 3 is a plan view (with drive stem shown in section) of a modified arrangement of indexing disc and limit switch;

Figure 1:
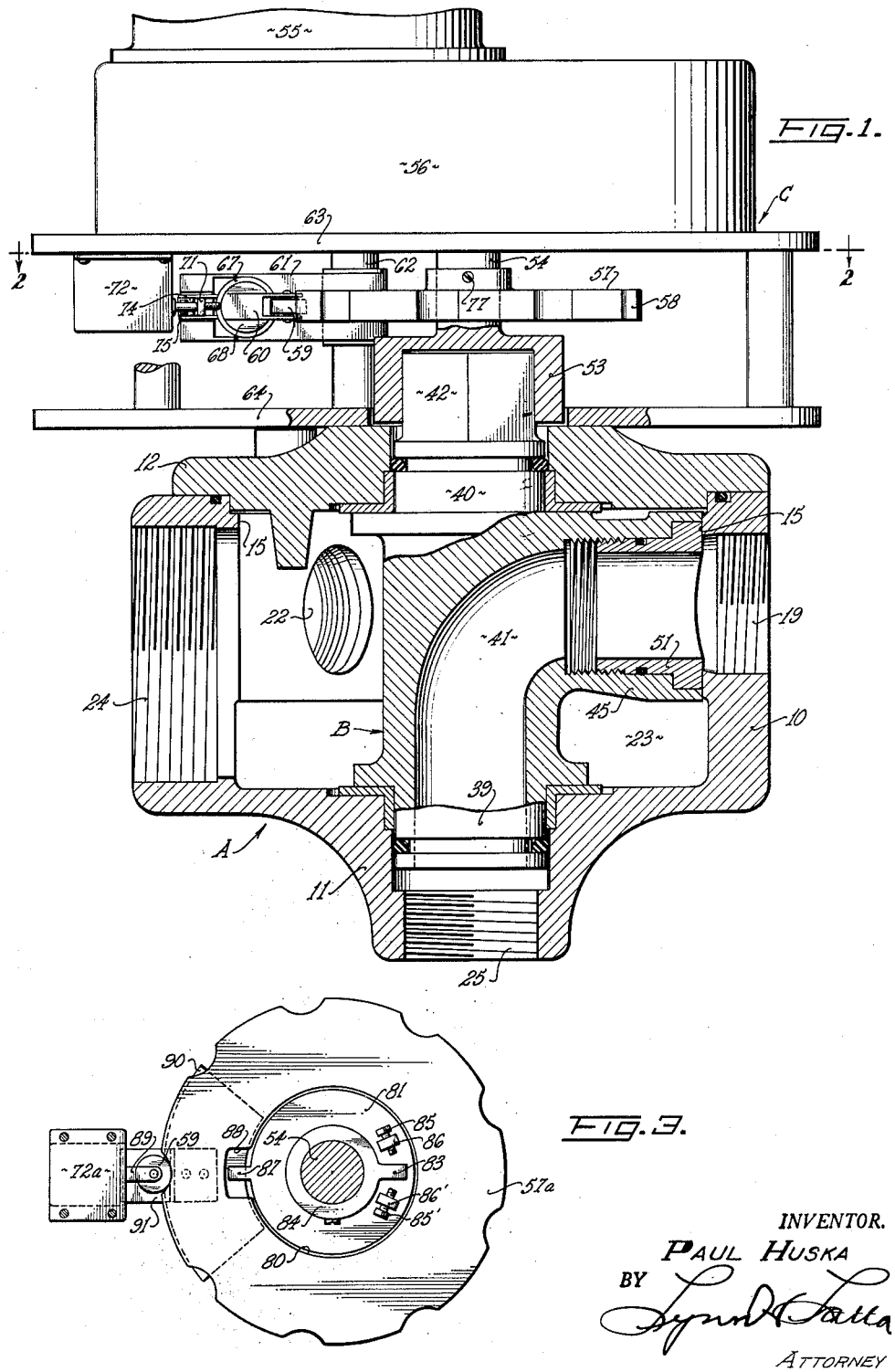
FIG. 1 is a view, partially in side elevation and partially in axial section, of a valve and actuator mechanism embodying my invention.

Referring now to the drawings in detail, I have shown therein, as an example of one form in which the invention may be embodied, a rotary selector valve of the general type shown in said Wadleigh patent, embodying a casing A having a lateral, peripheral wall section 10, a bottom end section 11 and an opposed top end section consisting in a separate cap 12 suitably secured to peripheral wall section 10. The latter has an accurately finished internal lateral wall surface 15 coaxial with the rotary axis of the valve, through which a plurality of inlet ports, arranged in circumferentially spaced succession around the periphery of the casing, communicate with a main chamber 23 defined within the casing. Two of these inlet ports are disclosed at 19 and 22 respectively. A much larger port 24, functioning as a service outlet port, likewise communicates with chamber 23 through the cylindrical lateral wall 15. An axial sampling port 25 is formed in the bottom end section 11. When the valve is installed in a fluid handling system (such as one wherein a series of flows of crude oil from a series of storage tanks or other sources are directed into the valve, co-mingled therein and thence collectively delivered to another storage container or processing system while another inlet flow is delivered to a sampling device for observation, testing etc.) a series of inlet flow lines (not shown) will be threaded into or otherwise connected (as by flanged couplings) to the several inlet port 19, 22 etc., the sampling outlet line will be connected to the port 25, and a larger service line will be connected into the port 24.

The valve further includes a rotor B having a tubular trunnion 39 journalled in the bottom end member 11 and communicating with sampling port 25, a solid trunnion 40 journalled in the end cap 12 and terminating in a squared driving shank 42, a lateral arm 45 having a suitable sealing fitting 51 with an arcuate face sealed to the cylindrical lateral internal wall 15 of the casing, and having an elbow passage 41 providing communication between the sampling port 25 and any selected inlet port 19, 22 etc. through the tubular trunnion 39 and sealing fitting 51, depending upon the position to which the valve rotor B is indexed. The inlet flow from the line communicating with the sealing fitting 51 will then pass through the rotor B and out through the sampling port 25, while all other inlet flow will enter and be co-mingled within the chamber 23 and collectively leave the valve through the service outlet 24.

The present invention provides an adjustable drive, indicated generally at C, for rotating the rotor B with an indexing action according to a selected schedule. Drive is transmitted to the squared shank 42 of roller B by means of a socket 53 on the lower end of a drive stem 54 which is driven by an electric motor 55 through a reduction drive 56, indicated schematically. Reduction drive 56 can for example be any conventional reduction gear unit for power transmission. Motor 55 can be an electric or a hydraulic or a pneumatic motor, or a combination electric-hydraulic or pneumatic drive, etc.

Figure 2:
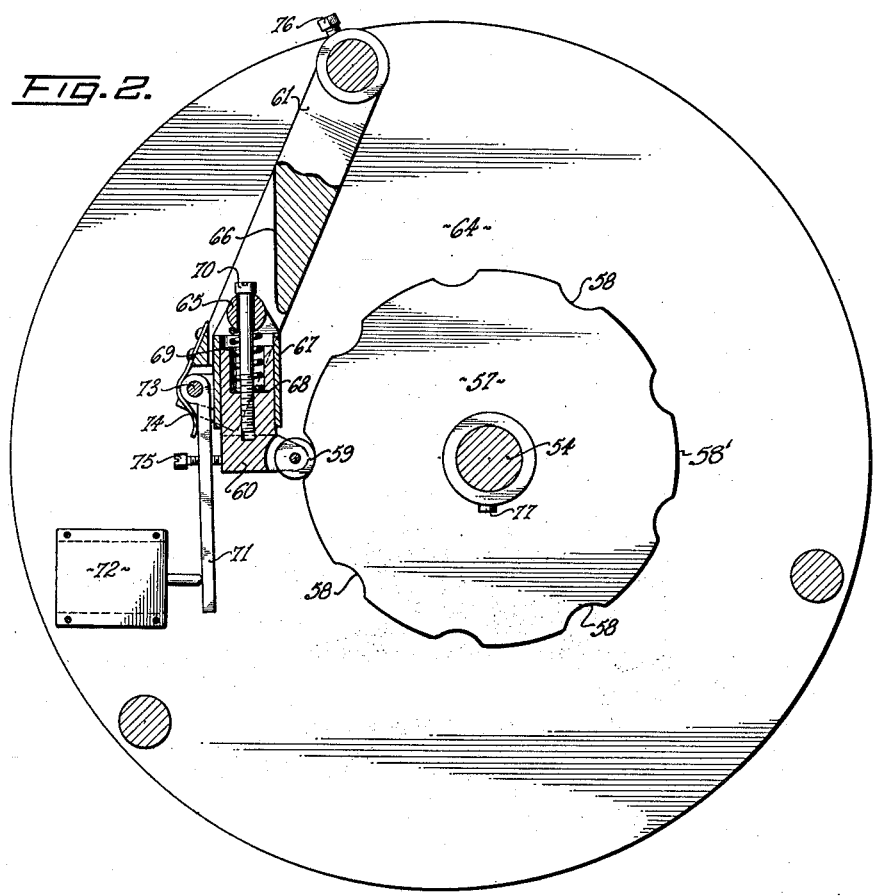
FIG. 2 is a transverse sectional view taken on the line 2—2 of FIG. 1.

The Invention as Disclosed in FIGS. 1 and 2

In this form of the invention, there is provided an indexing disc 57 secured to the stem 54 and having in its periphery a series of detent depressions 58. A roller 59, rotatably carried by a yoke 60, is lightly spring loaded against the disc 57 and is adapted to drop into successive recesses 58 to accurately position the rotor B with respect to corresponding ports 19, 22 etc. While the particular valve shown in FIG. 1 has nine of the peripheral ports 19, 22, etc., and there is disclosed a corresponding series of nine recesses 58, it will be understood that this indexing mechanism can be applied to any selector valve regardless of the number of peripheral ports therein.

Yoke 60 is carried by an arm 61 which is attached, by means of an adjustment post 62, to a pair of upper and lower mounting plates 63 and 64 between which the indexing mechanism is disposed. Yoke 60 is pivotally attached to arm 61 by means of a pivot stud 65 which is pivotally mounted transversely in a bore 66 extending diagonally through arm 61. Attached to the respective ends of stud 65 is a tubular shell 67 in which is telescopically mounted a shank 68 of yoke 60, shank 68 and shell 67 being preferably cylindrical. Shell 67 is received in the bore 66 of arm 61. Shank 68 has sliding adjustment in shell 67, being urged away from stud 65 by a coil spring 69 received in a counterbore in shank 68 and under compression between stud 65 and the bottom of said counterbore. Extending through coil spring 69 is an adjustment screw 70 which also extends through a transverse bore in stud 65 and has a head engaging the latter to limit the projection of yoke 60 away from stud 65 in accordance with the position of adjustment of screw 70 in a threaded axial bore in shank 68.

At this point it may be noted that by adjusting yoke 60 bodily along the axis of shell 67, the indexing position of disc 57, determined by bottoming of roller 59 in a recess 58, may be adjusted about the axis of stem 54.

Movement of yoke 60 radially with respect to disc 57, as the roller 59 rides into and out of a recess 58, is transmitted through a trigger 71 to a limit switch 72 to control the starting and stopping of motor 55. Limit switch 72 may be a microswitch or a precision snap action switch or any equivalent switching device. In any event, switch 72 is a spring loaded switch having one position determined by depression of its actuator button by trigger 71 and self returning to an alternate position when the trigger 71 is drawn away from it. For example, it may have a normally closed position, being moved to the open position by the operation of trigger 71 and self returning to its closed position.

Movement of roller 59 in dropping into a detent recess 58 is magnified at the end of trigger 71 where it engages the limit switch 72. The speed of operation of the switch with reference to the movement of roller 59 in detent 58 may be adjusted by means of an adjustable connection between trigger 71 and yoke 60 comprising a pivot 73 linking one end of trigger 71 to a pair of ears on yoke mounting shell 67, a loading spring 74 yieldingly urging the trigger 71 toward the yoke 60, and an adjusting screw 75 which is threaded through the trigger 71 and engages the shoulder of yoke 60 to adjust the trigger 71 away from the yoke against the yielding resistance of spring 74.

Arm 61 is adjustably secured to pivot 62 (which is fixed in the mounting plates 63, 64) by means of a set screw 76 threaded through the hub of arm 61 and clamping against stud 62. A rought positioning adjustment of the yoke 60 with reference to indexing disc 57 may thus be accomplished by loosening the set screw 76, manually adjusting arm 61 to a selected position and again tightening the stud screw 76 to secure the arm 61 in a selected fixed position.

The indexing disc 57 likewise may be rotatably adjusted with reference to stem 54 by loosening a set screw 77 which secures it to the stem 54. Thus a rough adjustment of the indexing disc with reference to the position of rotor B may be obtained, and a finer adjustment of indexing can be obtained by operation of adjusting screw 70 to adjust the position of yoke 60 with reference to arm 61.

Figure 4:
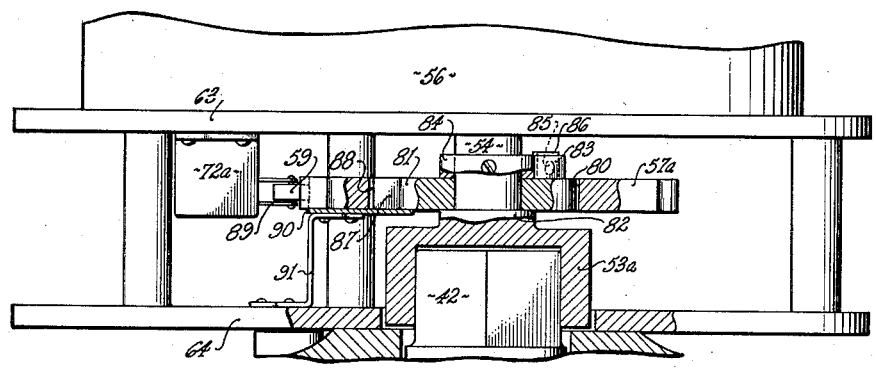
FIG. 4 is a vertical sectional view of the same.

*Preferred Form of Indexing Mechanism—FIGS. 3 and 4*

Referring now to FIGS. 3 and 4, there is shown therein a simplified and preferred form of the arrangement indexing disc 57a and limit switch 72. In this arrangement, indexing disc 57a is in the form of a flat ring having a cylindrical bore 80 in which is rotatably received a hub disc 81 lying in the same plane as indexing disc 57a. As shown in FIG. 4, the hub disc 81 is rotatably mounted on stem 54, having a central cylindrical bore through which the stem 54 extends loosely. Hub disc 81 may be supported upon a shouldered portion 82 of drive socket 53a.

A lost motion drive connection between stem 54 and disc 57a (which may be either single stage or two stages as will presently appear) is provided for by an integral drive dog 83 projecting radially from the periphery of a collar 84 secured to stem 54 immediately above disc 81, and alternately engageable with set screws 85, 85' threaded through integral ears 86, 86' on disc 81, projecting upwardly therefrom. Adjustment of set screws 85, 85' provides for variation of the degree of lost motion between the disc 81 and disc 57a in any reversal of relative rotation.

Another stage of lost motion drive is provided for by a drive dog 87 secured to and projecting from the periphery of disc 81, and shoulders defining the respective ends of an arcuate recess 88 communicating with bore 80 in index 57a.

Limit switch 72a, in this arrangement, has an actuator plunger 89 carrying a roller 59 which engages in the detents 58 of disc 57a, the plunger 89 having an axial sliding movement on a radius of stem 54.

Indexing adjustment of disc 57a with reference to disc 81 is provided for by the adjusting screws 85, 85', in that one screw can be advanced while the other one is backed off, thus shifting the median point between the screws with reference to the disc 81 and correspondingly providing a rotatable indexing adjustment of the drive connection between stem 54 and disc 81. Furthermore, the adjusting screws 85, 85' may be of such length and so arranged as to provide for rigidly connecting the disc 81 to stem 54 in any selected one of a series of indexed positions, by adjusting both screws to simultaneously engage opposite sides of the dog 83, leaving a single stage of lost motion drive provided for by dog 87 and notch 88. This indexing adjustment provides a simplified and improved adjustment in lieu of the several adjustments provided for in FIG. 2.

The lost motion between index disc 57a and drive stem 54 is yieldingly resisted by a braking connection between disc 57a and fixed mounting plate 64. By way of example, this braking connection is shown as an arcuate shoe 90 carried by a bracket 91 (FIG. 4) mounted on plate 64 and frictionally engaging the underside of disc 57a. Bracket 91 is preferably of spring material so as to provide a light spring loading of the shoe 90 against the under face of disc 57a.

*Control Mechanism*

In its operation between its open and closed positions, limit switch 72 (or 72a) constitutes a portion of a control mechanism for starting and stopping the motor 55 in which subsequent stages of indexing operation may be initiated by any primary control device such as a time clock (indicated at TC in FIG. 5) or a float operated switch or pulse-sending device, or any other selected condition-responsive control element. This control apparatus, including the limit switch 72, includes mechanism for starting and maintaining the operation of motor 55 from a point where follower roller 59 is resting in the bottom of a detent 58 to the point where it drops into a succeeding detent 58 brought to it by one stage of rotation of the disc 57 or 57a. The control apparatus further includes means for then stopping the operation of the motor as the roller 59 drops into the succeeding detent, and the arrangement may then be such that the control circuit is reset for a subsequent stage of indexing movement either in response to a further operation of the primary control device TC or as the automatic result of the closing of the previous stage of indexing movement; and a further stage of indexing movement is again initiated by a further operation of the primary control device TC.

Figure 5:
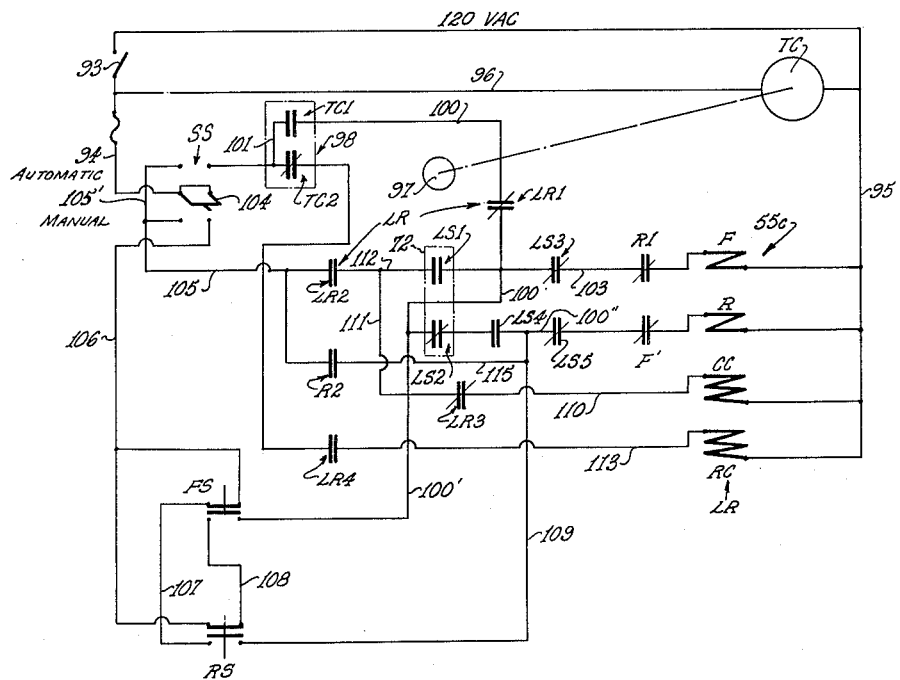
FIG. 5 is a schematic diagram of the control circuit of the apparatus.

Referring now specifically to the arrangement shown in FIG. 5, the circuit shown therein is illustrative of a control circuit that may be employed. From an electric current source indicated at 120 VAC (e.g. 120 volts alternating current) power may be applied through a main line switch 93 to main conductors 94 and 95 of the control circuit. Primary control element TC, shunted across the conductors 94, 95 by a connection 96, may be utilized to drive a starting cam 97 which, at a pre-determined interval, will actuate a single pole double throw microswitch 98 having pairs of contacts TC1 (normally open) and TC2 (normally closed). When automatic controller TC actuates switch 98, it will be reversed, contacts TC1 being closed and contacts TC2 being opened. Connected to contacts TC1 are conductors 100 and 101, the former leading to the forward control of motor 55 and the latter being connected to power lead 94 during automatic operation. The closing of contacts TC1 initiates forward operation of motor 55.

The switch 72, actuated mechanically by indexing disc 57, has two sets of contacts LS1 (normally open) and LS2 (normally closed).

When follower roller 59 rides upon one of the lobes of indexing disc 57, responsive switch 72 will be reversed, contacts LS1 being closed and contacts LS2 being opened. Closing of contacts LS1 maintains the forward circuit to motor 55, started by switch TC1.

In series in conductor 100 is a normally closed switch LR1 of a latching relay LR which also includes normally open contacts LR2, normally closed contacts LR3, and normally open contacts LR4. The closing of contacts TC1 by operation of the primary control device TC, completes a circuit through the normally closed contacts LR1 and thence through normally closed contacts LS3 and R1 in series with the forward contactor holding coil F of the motor control 55c, in a conductor connection 103 branching from conductor 100.

The other side of the motor controller 55c is connected to the power lead 95, as shown. Conductor 101 is adapted to be connected to the other power lead 94 through a selector switch SS (double pole, double throw) when the movable contactor 104 thereof (constantly connected to lead 94) is closed on a pair of contacts thereof in the "automatic" position so designated in the drawing, one of these contacts being connected to conductor 101 and the other being connected to a conductor 105 through a jumper 105'. In an alternate position, contactor 104 may be connected to a second pair of contacts, one connected to jumper 105' and conductor 105, and the other connected to a conductor 106 leading to one side of a reversing switch RS of a pair of manual control switches also including a forward control switch FS one side of which is cross connected to the switch RS by cross wires 107 and 108. Switch FS is connected to conductor 100 by a branch connection 100'. Switch RS is connected by a conductor 109 to a junction between normally open contacts LS4 and normally closed contacts LS5.

Contacts LS2, LS4 and LS5 are in series with normally closed contacts F' in a reversing control branch circuit 100'' extending between conductor 100 and reverse contactor holding coil R of the motor control 55c. Contacts LR3 of the latching relay are in series with closing coil CC of latching relay LR and the conductor 105 through connections 110, 111 and 112 (the latter connected to conductor 100 through contacts LS1 and to conductor 105 through contacts LR2). Contacts LR4 of the latching relay LR provide a connection between its release coil RC and contacts TC2 through connections 113 and 114. Normally open contacts R2 control a connection 115 between conductors 109 and 105.

Contacts LS3 and LS4 are mechanically connected in a common switching unit, although electrically isolated from one another as schematically indicated. The unit LS3, LS4 is actuated by disc 57 upon arrival at a limit position of forward rotation from which it is to be rotated in the reverse position for return to a starting position, as more fully explained hereinafter. Although the mechanical parts are not shown, it will be understood that any suitable conventional arrangement may be utilized for juxtaposing the switch unit LS3, LS4 and disc 57 so that when the latter has reached its limit position of rotation, a suitable projection carried thereby will engage and actuate the switch unit LS3, LS4.

Normally closed contacts LS5, which are mechanically independent of all other contacts, are arranged to be mechanically actuated by disc 57 upon its arrival at its starting position in its return movement. Such mechanical actuation may be of the same type of arrangement as that existing between disc 57 and contacts LS4.

*Operation*

In the operation of the control mechansm, the circuit 94, SS, 101, TC1, 100, 103 which is initially established to the forward contactor coil of motor control 55c by the closing of automatic control contacts TC1 to energize controller winding F, is maintained by the holding circuit 94, SS, 105', 105, LR2, LS1, 103 when microswitch LS1 is closed as the result of cam follower roller 59 riding onto a lobe of indexing disc 57 as the latter is revolved by the motor 55. Latching relay LR is reversed from its position shown, in response to the closing of switch LS1 which establishes a circuit 94, 100, LS1, 112, 111, 110 through normally closed contacts LR3 of relay LR to actuate the latter by energizing its closing coil CC. Reversal of relay LR opens contacts LR1, closes LR2 and opens LR3 and closes LR4. The relay latches in this reversed position until released. The motor starting circuit from TC1 through conductor 100 and 103, and the latch actuator circuit of relay LR through LR3 and 110 are simultaneously opened at contacts LR1 and LR3, and simultaneously the holding circuit 105, 112, etc., is established through LR2 and LS1, and the release circuit is set up at LR4 (but remains open at reversed switch TC2).

The motor will continue to drive forwardly until follower roller 59 drops into a notch 58, when microswitch 72 will return to its self-maintaining position, opening LS1 and closing LS2. Opening of contacts LS1 breaks the circuit to motor controller 55c, causing it to deenergize the motor, which will stop until another impulse from control device TC initiates a further step of indexing movement.

Resetting of latching relay LR occurs when control switch 98 is restored to its normal condition (as shown) by operation of control device TC, the closing of contacts TC2 completing the circuit to release coil RC to unlatch the relay, causing its self return to the condition shown in the drawing. The cam 97 may be designed so as to effect this restoration of switch 98 to its normal position as shown, at an interval subsequent to the completion of the cycle described above, and at any selected time prior to the initiation of a subsequent stage of indexing movement (which may if desired be coincident with such initiation of a subsequent stage).

With successive steps of indexing movement, the valve rotor B will be shifted to successive positions within casing A.

At the end of the last step of indexing movement, the reverse holding coil R of the motor controller 55c will be energized by the closing of contacts LS4 as the result of mechanical actuation of switch unit LS3, LS4 by arrival of the indexing disc 57 at its final limit position of rotation, to reverse the same from the normal self closing position of this unit shown in the diagram, whereupon the reversing circuit will be completed at contacts LS4 from power lead 94 through conductor 100 and through contacts LR1, LS2, LS5, F' to the reversing coil R, thus setting up a reversing circuit to the motor which is maintained by the sub-circuit through contacts R2 and conductor 115 until the disc 57 has rotated entirely back to its starting position, this maintaining circuit being unaffected by the re-opening of contacts LS4 by self opening action when the disc 57 has moved away from actuating proximity to the unit LS3, LS4. At this point it should be explained that holding contacts R2 are mechanically associated with reversing coil R so as to be shifted from their normally open position shown to a closed position as the result of energizing coil R and remain closed so long as coil R remains energized thus assuring the full return of the disc to its starting position.

The opening contacts LS5 upon return of disc 57 to its starting position deenergizes reversing coil R causing the motor controller to deenergize the motor and stopping it with the disc reset in its starting position. The entire system is then ready for another full cycle of operation which may be initiated by primary controller TC.

Upon shifting selector switch SS to its alternate position engaging the lower pair of contacts shown in the diagram, the connection from power lead 94 to the conductor 105 of the maintaining circuit will be re-established due to the jumper connection 105', and, in lieu of the connection to automatic circuit 101, 100 etc., a connection will be established to conductor 106 and thence to the manual control switches SS and RS which can be operated alternately to provide stages of forward indexing movement and a final return movement in a manner analogous to the above described operation of the automatic circuit with the exception that the stages of operation are initiated manually.

The invention is not to be construed as being restricted to the specific structures of the several forms thereof which are described above by way of example and not limitation. Other structures, which will suggest themselves to those skilled in the art after becoming conversant with the invention as illustrated herein, will be understood to be embraced within the scope of the invention as defined in the appended claims. With particular reference to the indexing disc 57 (57a) it will be apparent that it has an operative periphery comprising a circumferential succession of alternately raised and depressed cam faces (the latter being the detent depressions 58 and the former being the segmental cylindrical faces indicated at 58' in FIG. 2); and that the successive stages of indexing operation are controlled by the reaction between the successive cam faces and the follower roller 59.

I claim:

1. Indexing mechanism for actuating a rotary selector valve, having a valve housing, said indexing mechanism comprising, in combination: an indexing disc having a periphery comprising a succession of circumferentially spaced segmental circular raised cam faces and a corresponding series of concave detents between said raised cam faces; said detents being positioned to correspond to a series of lateral ports in said valve housing; a cam follower including a roller, means mounting said roller for radial movement in contact with said disc periphery, and a switch actuator following said radial roller movement, said roller yieldingly engaging said indexing disc periphery; means including a reversible electric actuator motor for simultaneously rotating said valve and indexing disc in unison; control means for initiating a stage of operation of said motor wherein said disc is advanced from a position where said follower has been in engagement with one of said detents to a position where it engages a succeeding detent, and means responsive to radial movement of said follower to said last mentioned position, for terminating said stage of operation, said responsive means comprising a limit switch adapted to maintain an energizing circuit to said motor while said roller rides against one of said raised cam faces and to interrupt said circuit when said roller drops into one of said detents; said control means including a control circuit interconnecting said limit switch and said initiating control means adapted from the beginning of a complete cycle of operation to main recurring forward indexing movements of said indexing disc and rotor through a number of stages corresponding to the number of said lateral ports, and further including reversing control means, responsive to arrival of said indexing disc and valve at a final position of forward indexing movement, to set said control circuit for reverse operation of said motor from said final position back to the position of starting said full cycle of operation, in an uninterrupted resetting movement.

2. Indexing mechanism for actuating a rotary selector valve having a valve housing, said indexing mechanism comprising, in combination: an indexing disc having a periphery comprising a circumferential succession of alternately raised and depressed cam faces corresponding to a series of lateral ports in said valve housing, a cam follower yieldingly engaging said indexing disc periphery, means including an actuator motor for simultaneously rotating said valve and indexing disc in unison, control means for initiating a stage of operation of said motor wherein said disc is advanced from a position where said follower has been in engagement with one of said cam faces to a position where it engages a succeeding cam face of corresponding radial position, means responsive to radial movement of said follower to said last mentioned position, for terminating said stage of operation, a lost motion drive connection between said motor and said indexing disc, and means for adjusting said disc circumferentially with respect to said lost motion driving connection.

References Cited in the file of this patent
UNITED STATES PATENTS

| | | |
|---|---|---|
| 2,637,835 | Davidson | May 5, 1953 |
| 2,740,081 | McKay | Mar. 27, 1956 |
| 2,806,486 | McDonald | Sept. 17, 1957 |